(12) United States Patent
Davies et al.

(10) Patent No.: US 6,739,153 B2
(45) Date of Patent: May 25, 2004

(54) OPTICAL WORKSTATION

(75) Inventors: Philip Andrew Davies, Cambridge (GB); Anil M Patel, Leicestershire (GB); Malcolm Sargeant, Cambridge (GB); Brian Watson, London (GB); Tony Wills, London (GB)

(73) Assignee: Melles Griot Limited, London (GB)

( * ) Notice: Subject to any disclaimer, the term of this patent is extended or adjusted under 35 U.S.C. 154(b) by 298 days.

(21) Appl. No.: 09/877,941

(22) Filed: Jun. 8, 2001

(65) Prior Publication Data

US 2002/0021502 A1 Feb. 21, 2002

(30) Foreign Application Priority Data

Aug. 14, 2000 (GB) .............................................. 0019972

(51) Int. Cl.⁷ .............................................. C03B 37/00
(52) U.S. Cl. .................. 65/375; 108/57.12; 108/153.1; 108/155; 108/156; 108/157.1; 108/158.11; 108/161; 248/188; 248/188.1; 248/188.8; 248/177.1; 248/178.1; 248/176.3; 248/636; 248/27.1
(58) Field of Search .......................... 65/375; 108/57.12, 108/153.1, 155, 156, 157.1, 158.11, 161; 298/188, 188.1, 188.8, 177.1, 178.1, 176.3, 636, 27.1

(56) References Cited

U.S. PATENT DOCUMENTS

| | | |
|---|---|---|
| 4,645,171 A | 2/1987 | Heide |
| 6,084,396 A | 7/2000 | Rao |
| 6,095,482 A | 8/2000 | LaGrotta et al. |

OTHER PUBLICATIONS

Melles Griot. "Fixed Table Stands." XP–002231609. 1988.
Linos Photonics. "Breadboards and Optical Table Tops." XP–002231610. 2001.
"High Performance Lab Tables." XP–002231605.
Melles Griot. "The Melles Griot ScienceDesk concept." XP–002231606.
Newport. "Light Load Vibration Isolation Workstations." XP–002231607.
Melles Griot, "The practical application of light", 1999, pp. 38.7–38.9 and 40.1–40.6.

*Primary Examiner*—John Hoffmann
(74) *Attorney, Agent, or Firm*—Renner, Otto, Boisselle & Sklar, LLP

(57) ABSTRACT

An optical workstation comprising an optical breadboard supported by a frame, the frame comprising a plurality of upstanding legs interconnected by laterally extending cross-beams, the cross-beams defining a space into which the optical breadboard is received and laterally enclosed. By laterally enclosing the optical breadboard with the cross-beam frame elements, side protection for the optical breadboard is provided, thus protecting it from lateral impacts against which conventional damping mounts are not effective. In addition, since the cross-beams are part of the frame structure, they provide a stable and rigid platform for mounting optical and other components at the very edge of the workstation outside the optical breadboard area. Anchor points in the cross-beams are provided for this purpose. Incorporation of the cross-beams into the frame structure also provides an enhanced level of structural rigidity which allows the frame to be made of aluminum rather than steel to provide a much lighter, more maneuverable product.

9 Claims, 7 Drawing Sheets

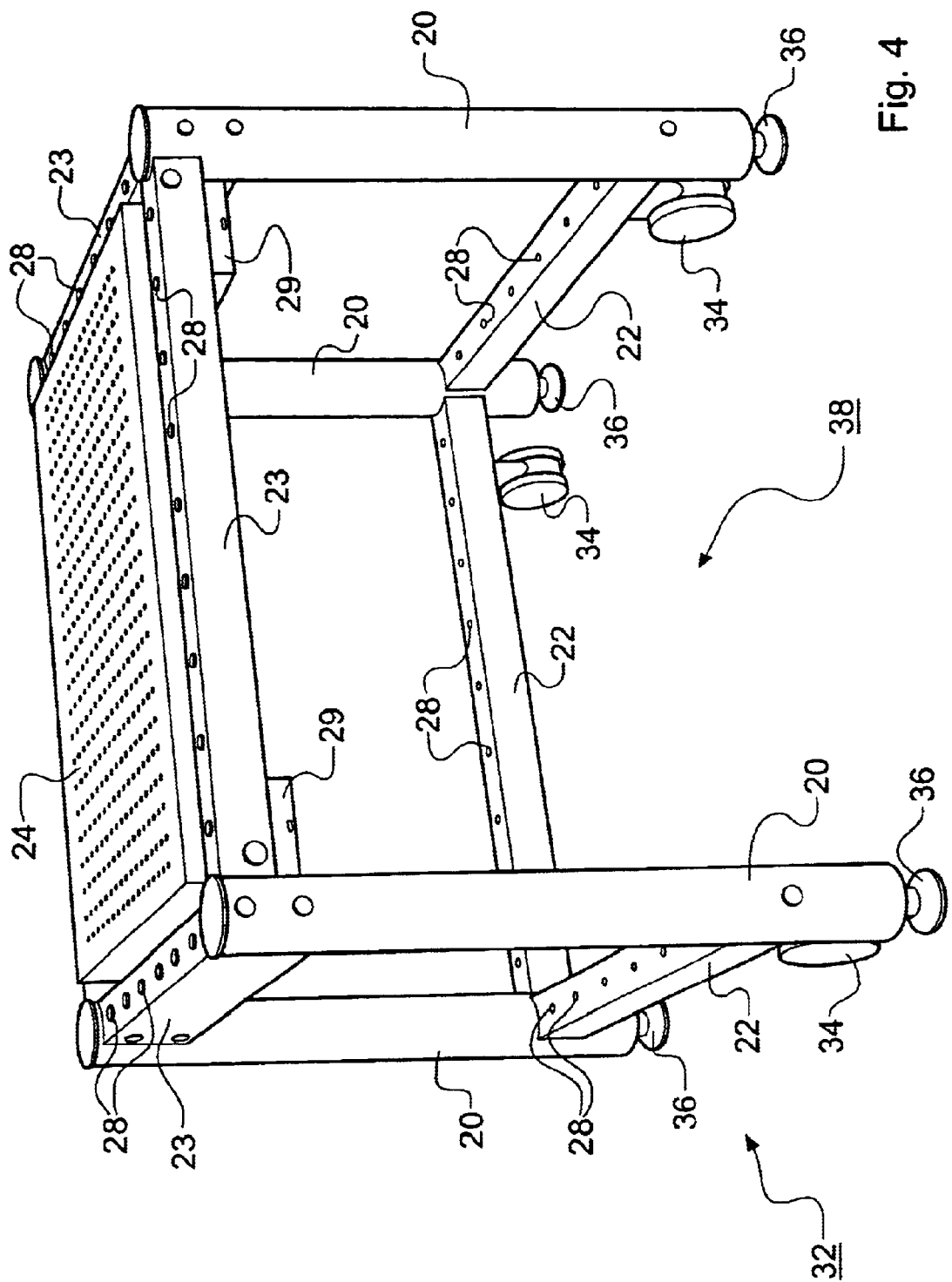

OPTICAL WORKSTATION

BACKGROUND OF THE INVENTION

The present invention relates to optical workstations of the type having a work surface made of an optical breadboard which is held by a supporting frame.

A typical prior art workstation comprises an optical breadboard mounted on a steel frame, usually on vibration damped mounts. A typical optical breadboard has parallel upper and lower rectangular stainless steel plates separated by a laminar or cellular structure, sometimes including a honeycomb structure. An optical breadboard usually has steel or wooden sides and may incorporate damping devices within its interior. The upper plate has an array of threaded mounting holes for mounting optical and other components. Prior art workstations also sometimes incorporate mountings for shelves or other surfaces for writing support, storage or placement of items of equipment.

FIG. 1A of the accompanying drawings shows an example of a prior art optical workstation 100, trade name TMC 63-500 series, supplied by the Technical Manufacturing Corporation of Peabody, Mass., USA. The optical workstation 100 has a steel frame 102 with four legs 104 held together at near-floor level by bars 106 linking the four legs 104. Tie-bar gussets 108 are also provided to increase frame rigidity, thereby compensating for the lack of a front tie-bar which is omitted in order to provide a knee-well space. Diagonal strengthening elements 116 are also provided. An optical breadboard 110 is supported by the frame 102 on gimbal piston isolators 112 fixed above the top of the legs 104. The optical workstation top 114 extends laterally beyond the frame slightly when viewed in plan view.

FIG. 1B of the accompanying drawings shows another example of a prior art optical workstation, which is supplied by Newport Corporation of Irvine, Calif., USA. The basic components of the optical workstation are a frame 12, with four legs 6, and an optical breadboard 5. The optical breadboard 5 is held to the frame 12 by mounting points 10 situated at the upper ends of the legs 6. The frame 12 is held together by upper and lower reinforcement struts 7 and 8 linking the legs 6, and also by an additional diagonal reinforcement strut 9 at the rear of the frame 12. The front of the frame is left open for knee-well access of a person seated at the workstation. The frame 12 is made of steel to provide sufficient structural rigidity. The frame 12 also incorporates castors 11. An option available with this Newport workstation is a support ring 1, shown in the figure. The support ring 1 is removably mounted to the frame 12 by means of four elongate bracket mounts 4, each connected by bolts to a leg 6 and extending diagonally upward and outward to a corner of the support ring 1. The support ring 1 surrounds the optical breadboard 5 and supports armrests 2 and a removable component mount 3 for mounting equipment to the support ring 1.

SUMMARY OF THE INVENTION

According to the present invention there is provided an optical workstation comprising an optical breadboard supported by a frame, the frame comprising a plurality of upstanding legs interconnected by laterally extending cross-beams, the cross-beams laterally enclosing a space into which the optical breadboard is received.

By laterally enclosing the optical breadboard with the cross-beam frame elements, side protection for the optical breadboard is provided, thus protecting it from lateral impacts against which conventional damping mounts are not effective. In addition, since the cross-beams are part of the frame structure, they provide a stable and rigid platform for mounting optical and other components at the very edge of the workstation outside the optical breadboard area. By contrast, in the prior art Newport design of FIG. 1B, the work station edges have less stable mounting on the cantilevered support ring 1. In the prior art TMC design of FIG. 1A, the work station edges have mounting points provided by the overhanging edges of the workstation top 114, which are exposed to side impacts.

Incorporation of the cross-beams into the frame structure also provides a level of structural rigidity inherently superior to the above-described prior art optical workstations. For what is believed to be the first time, this permits the optical workstation frame to be made of aluminum rather than steel, since the enhanced inherent rigidity of the cross-beam design allows the lower strength material, aluminum, to be used while still retaining sufficient rigidity for usual optical workstation applications. The conventional prejudice against use of aluminum for optical workstations is thus overcome to provide a much lighter, more maneuverable product. For example, comparable aluminum and steel frames made according to the embodiment of the invention described below weighed 38 kg and 95 kg respectively. Other lightweight, lower strength materials, besides aluminum, could also be used to take advantage of the higher integrity structure, for example composite or compound materials.

The cross-beams can advantageously be provided with anchor points for mounting further optical components, thus taking advantage of the presence of stable peripheral frame elements. The anchor points may be arranged in a regularly spaced line or array for any of the cross-beams where a component mounting option is desired. In one example, the anchor points are spaced apart by a pitch of 100 mm (or 4") to provide compatibility with the pitch of the optical breadboard which will typically have a 50 mm or 25 mm (2" or 1") pitch. The anchor points may be spigot holes, threaded holes or a mixture of both.

The optical breadboard is preferably isolation mounted to the frame via damping mounts that are attached to the frame and support damping units. The damping mounts may be formed so as to give additional structural rigidity to the frame. The damping mounts may be directly attached to the frame, indirectly attached to the frame by way of at least one support beam, or may be attached to the frame using any combination of direct and indirect attachment means. Any support beam(s) may be formed so as to give additional structural rigidity to the frame.

The frame may be formed using modular components. Many such modular frames may be envisaged. In one example, the frame is assembled from two end units linked by laterally extending cross-beams. In this case, each end unit is formed integrally from two legs combined with laterally extending upper and lower crossbeams. Each end unit may be formed as a single welded or molded piece. Alternatively, an end unit may be formed by joining two legs with laterally extending upper and lower cross-beams by means of releasable fasteners. Such modular frames are simple to assemble and disassemble, and can be packed flat for transportation.

BRIEF DESCRIPTION OF THE DRAWINGS

Embodiments of the invention will now be described, by way of example only, with reference to the accompanying drawings in which:

FIG. 4 shows a perspective view of the embodiment of FIG. 3.

DETAILED DESCRIPTION

Figure 1A:
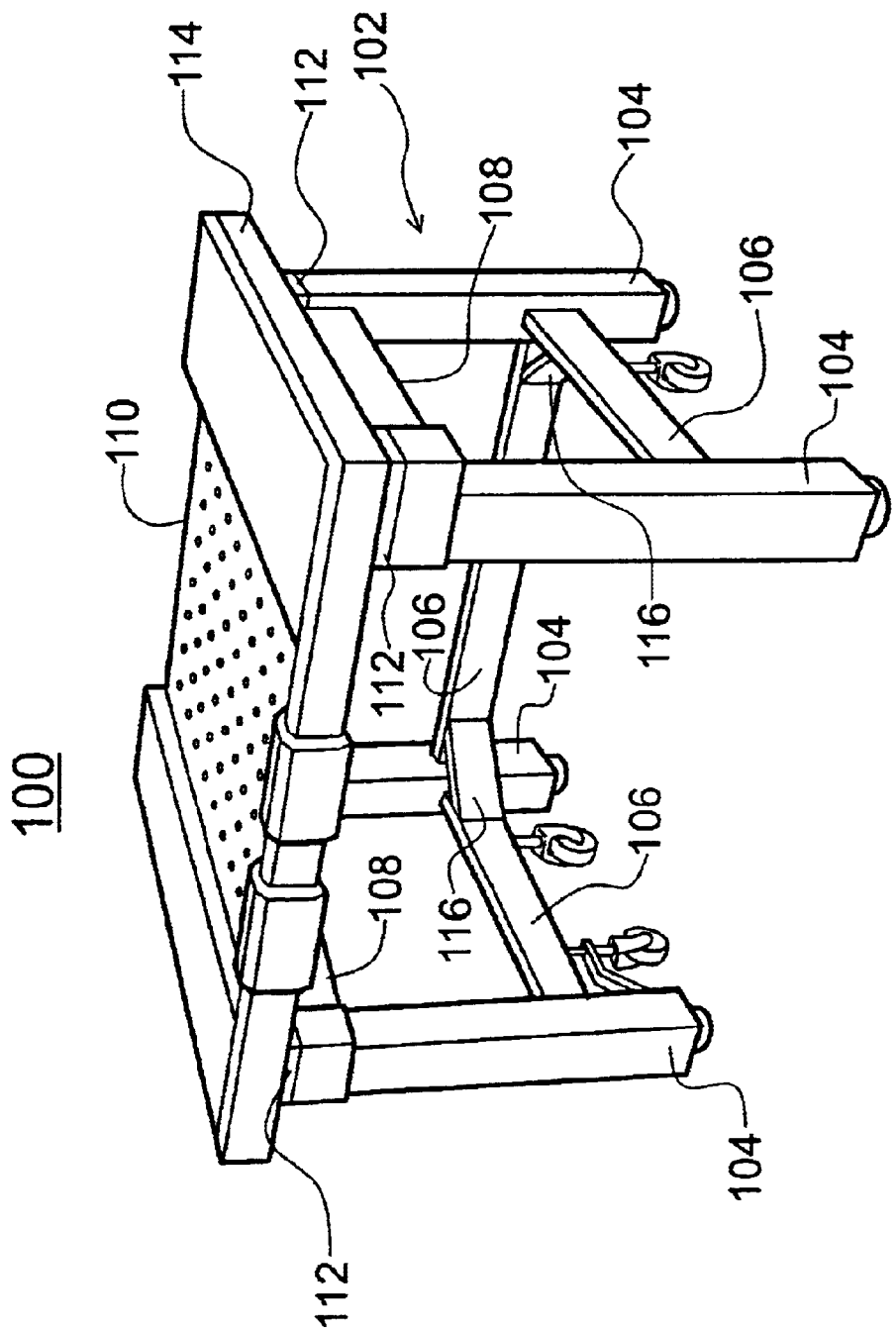
FIG. 1A shows a first prior art optical workstation.
Figure 1B:
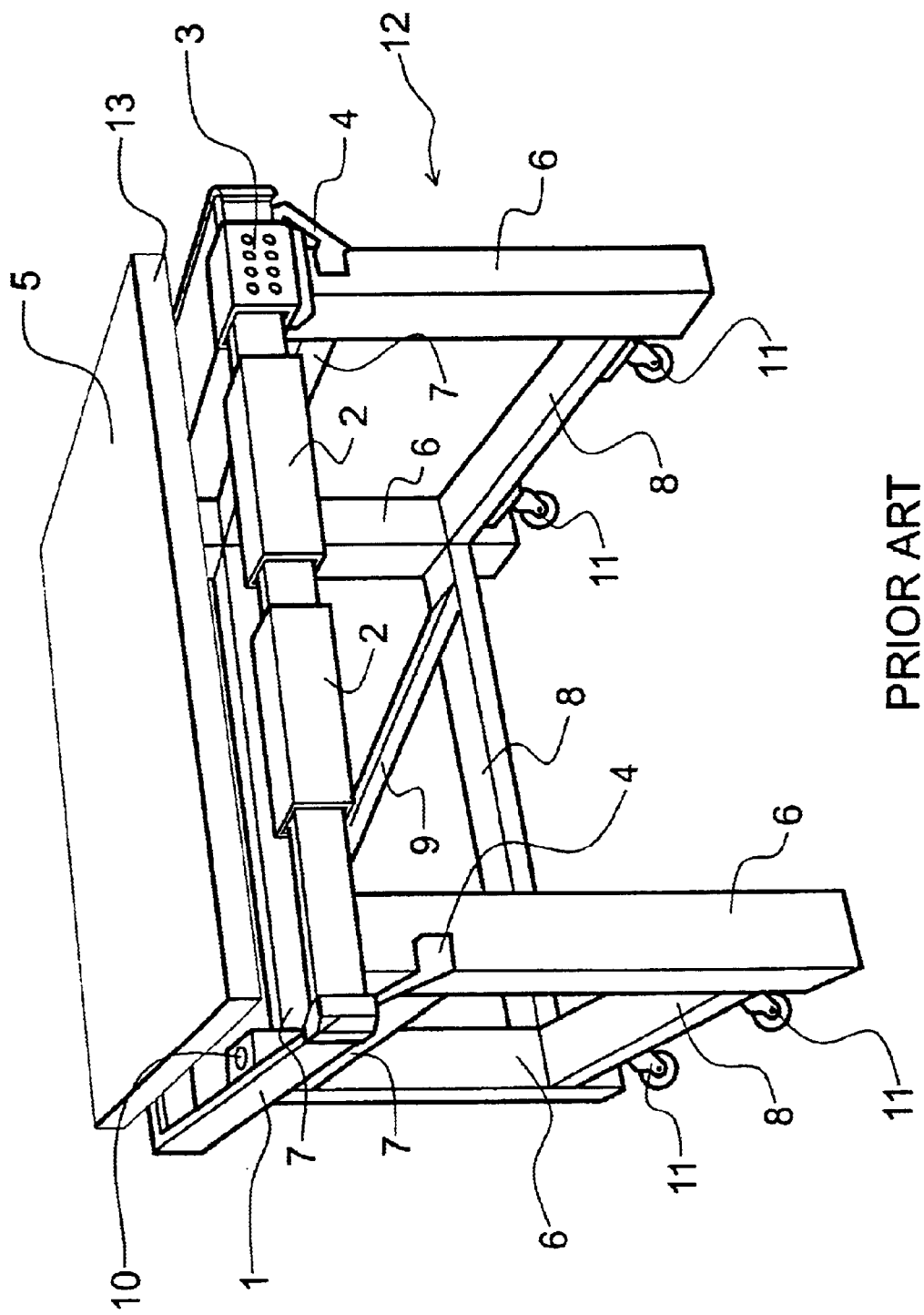
FIG. 1B shows a second prior art optical workstation.
Figure 2:
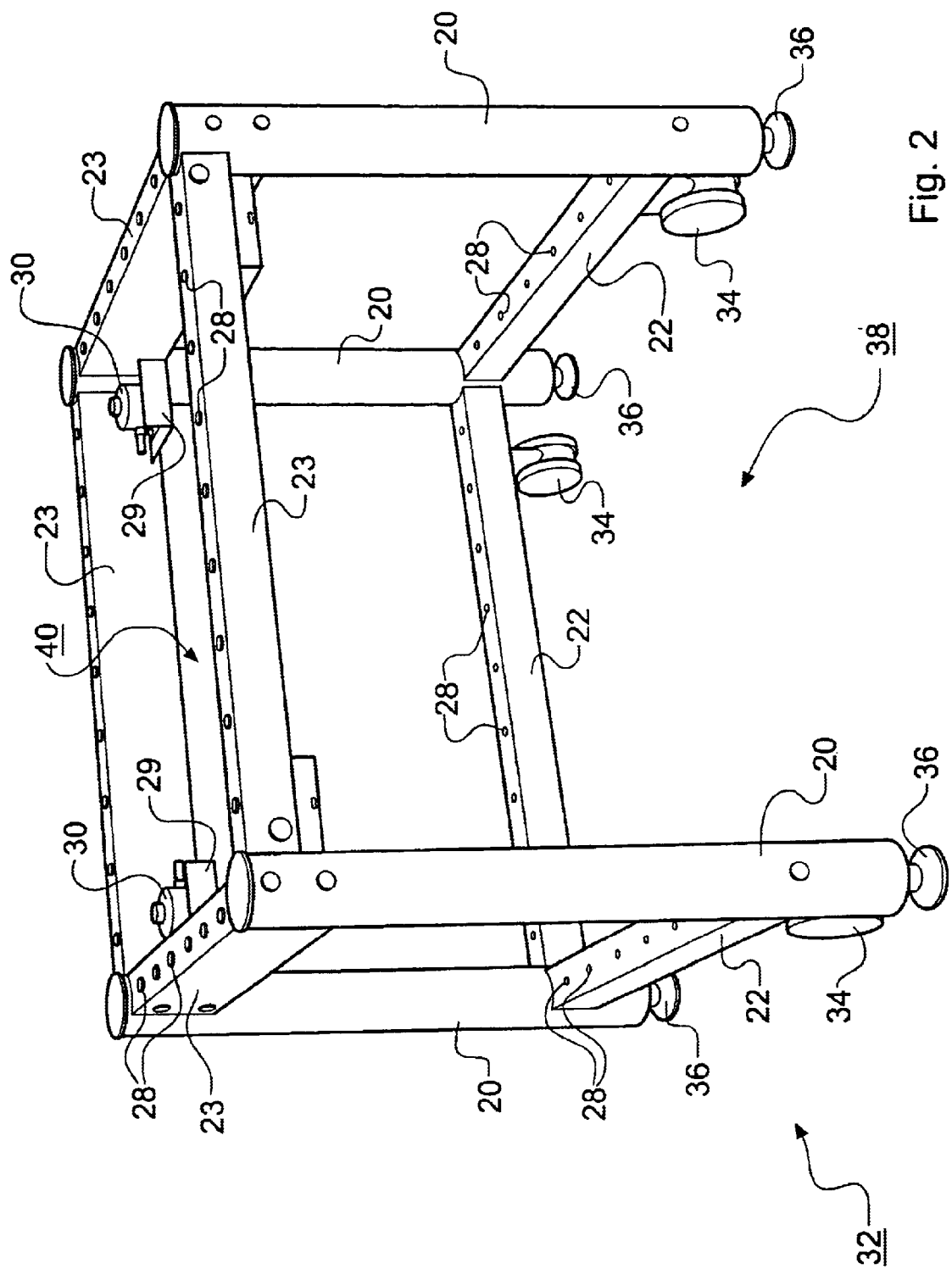
FIG. 2 shows a frame forming part of an optical workstation according to an embodiment of the present invention.

FIG. 2 shows a frame generally depicted by reference numeral 32. The frame 32 forms part of an optical workstation according to an embodiment of the present invention. The frame 32 comprises four upright cylindrical legs 20 interconnected by four laterally extending upper cross-beams 23 and three laterally extending lower cross-beams 22. The cross-beams 22, 23 are rectangular in cross-section. Adjustable feet 36 are connected to the lower part of the legs 20. The three lower cross-beams 22 are shown defining a knee-well space 38. The upper cross-beams 23 define a rectangular area 40 for receiving and laterally enclosing an optical breadboard (not shown in this figure). The legs 20, the upper cross-beams 23 and the lower cross-beams 22 are made from aluminum so that the frame 32 is relatively light in weight. Additionally, the frame 32 is a construction that is inherently rigid.

Damper mounts 29 are provided to support damping units 30 in each of the corners of the rectangular area 40 defined by the upper cross-beams 23. The damper units 30 are arranged to attenuate any transmission of mechanical vibration from the frame 32 to an optical breadboard 24 mounted within the space defined by the frame 32. Damping units 30 are well-known in the art.

One damper mount 29 is provided in each of the corners adjacent to the two legs 20 positioned furthest from the open end of the knee-well 38. A laterally extending upper support beam (hidden in the perspective of FIG. 2) is provided below the rectangular area 40 for supporting the two damper mounts 29 at the front of the workstation, whereas the two damper mounts to the rear of the workstation are mounted directly to the frame. The upper support beam is also useful for attachment of accessories, such as a slidable keyboard holder (not shown).

The upper cross-beams 23 and lower cross-beams 22 are provided with lines of regularly spaced frame anchor points 28 that are protected when not in use by anchor point covers 50. The separation pitch of the frame anchor points 28 is 100 mm or 4". Castors 34 are attached to frame anchor points 28 of the lower cross-beams 22. In this embodiment, the anchor points are in a linear arrangement, but a two-dimensional array of anchor points could also be provided, for example two adjacent lines of anchor points.

Figure 3:
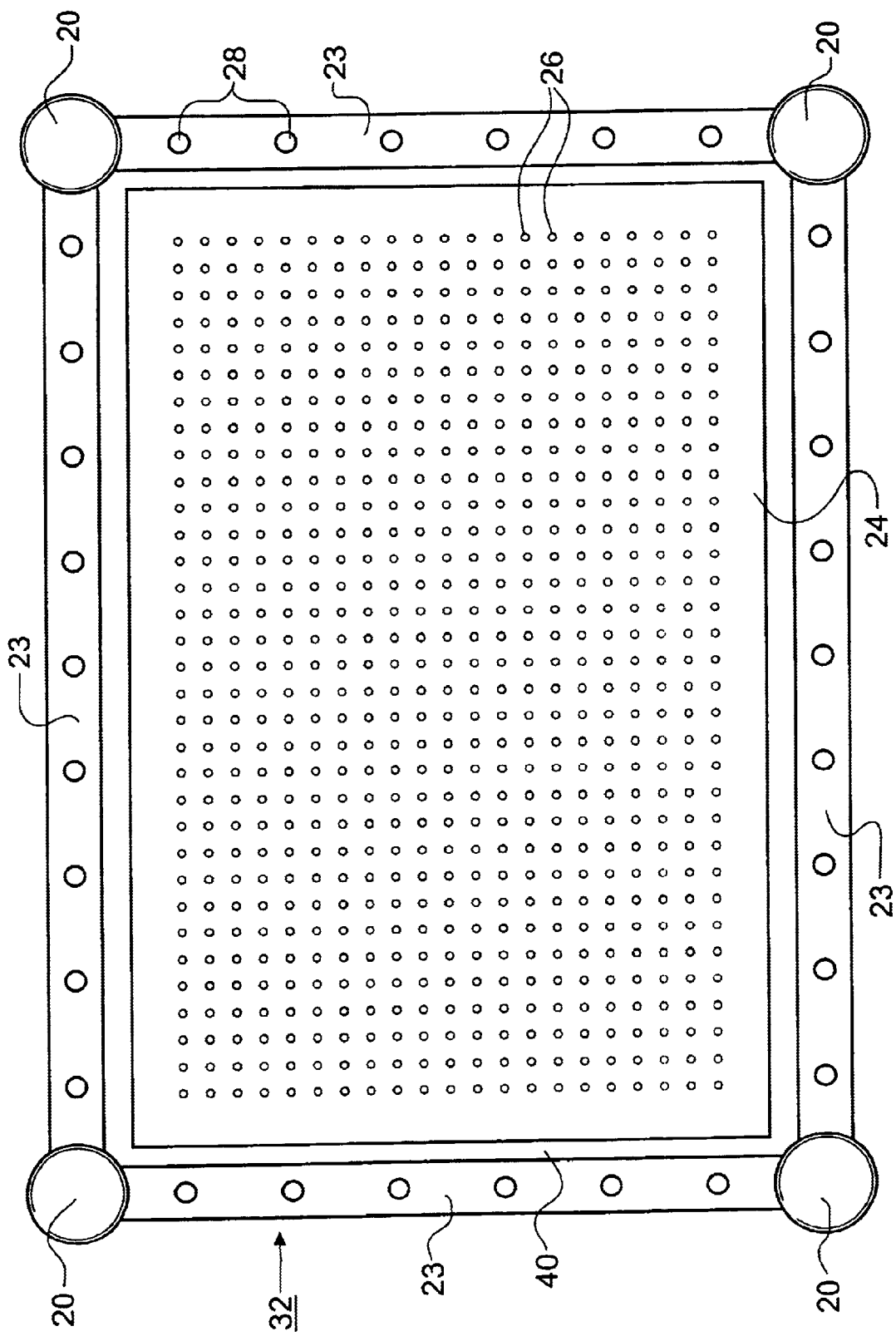
FIG. 3 shows a plan view of an optical workstation according to an embodiment of the present invention incorporating an optical breadboard.

FIGS. 3 and 4 show plan and perspective views of the optical workstation, with a rectangular optical breadboard 24 having now been placed in the frame shown in FIG. 2. The optical breadboard 24 is mounted in the frame 32 within the area 40 laterally enclosed by the upper cross-beams 23 (as viewed in plan). The upper cross-beams 23 thus laterally protect the edge of the optical breadboard 24. The optical breadboard 24 incorporates an array of optical table anchor points 26 which in this case are 6 mm (or ¼") diameter screw-threaded holes separated from their nearest neighbors by a pitch of 25 mm (or 1").

As can be seen from FIG. 4, the plane top surface of the optical breadboard 24 is approximately level with the top surface of the upper cross-beams 23. In some applications it may be desirable to mount the optical breadboard higher, so that its top surface stands slightly proud of the level defined by the cross-beam upper surfaces, or lower, recessed below the cross-beam upper surface.

Figure 5A:
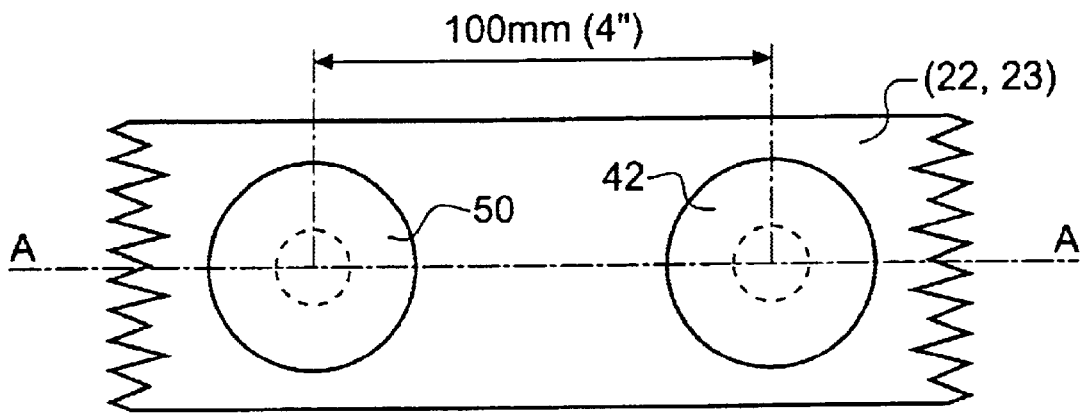
FIGS. 5A and 5B show an anchoring arrangement according to the embodiment of FIGS. 2 to 4 in plan and sectional view respectively.
Figure 5B:
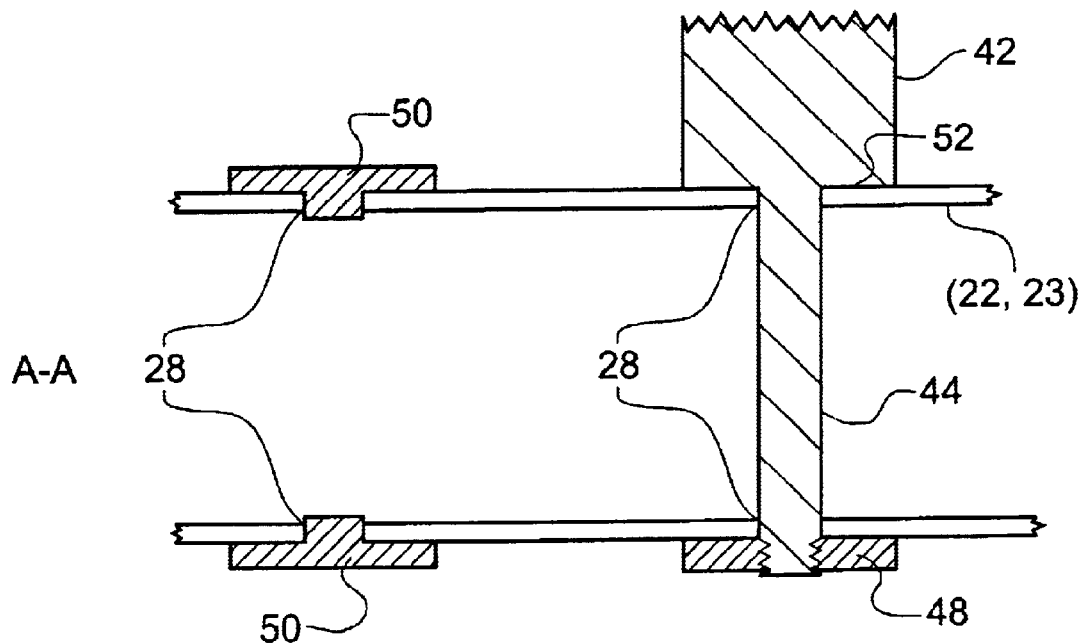

FIGS. 5A and 5B show two adjacent frame anchor points 28 in plan and sectional view respectively. FIG. 5A is a plan view of a partial section of one of the cross-beams 22 or 23. In this case, the cross-section of the cross-beam is rectangular. FIG. 5B is a vertical section A—A of FIG. 5A. Each anchor point 28 comprises a pair of coaxial circular holes, one in the upper cross-beam plate and one in the lower cross-beam plate. The left anchor point in the figures shows an unoccupied anchor point, in which the holes are plugged with covers 50. The right anchor point 28 is shown occupied with a spigot 44 (or belay pin) passing through the coaxial pair of holes. The spigot 44 extends from a lower end to a mounting post 42 and has a threaded end portion. The mounting post 42 may typically be a 25 mm, 1", 42 mm or 1⅔" diameter cylindrical element. The mounting post 42 has a lower end surface 52 that abuts the upper surface of the cross-beam 22, 23, being held securely in place by means of a retaining nut 48 threaded to the threaded end portion of the spigot 44 that protrudes through the lower anchor point hole.

A wide variety of components, either optical or non-optical, may be mounted to the frame anchor points 28. Compatible components will incorporate a suitable spigot 44 as part of their structure. Some examples of typical components for mounting on the anchor points 28 are: a wrist rest, a display support, a keyboard holder, 25 mm diameter posts, 1" diameter posts, 42 mm diameter posts, 1⅔" diameter posts, a camera, or a shelf (either above or below table level).

Figure 6:
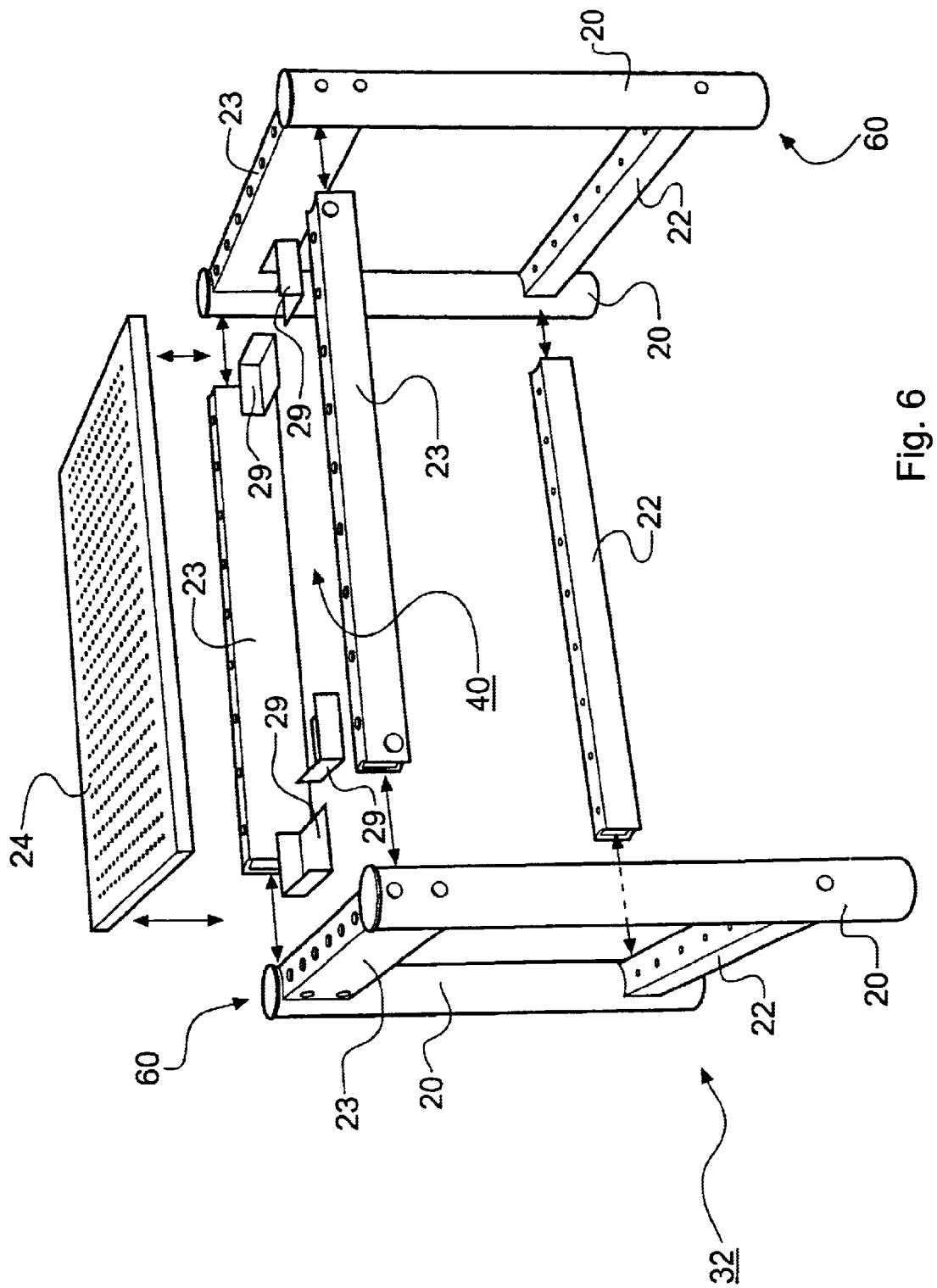
FIG. 6 shows an exploded view of a modular frame forming part of an optical workstation according to the embodiment of FIGS. 2 to 5.

FIG. 6 shows an exploded view of the frame 32 showing its construction in more detail. The frame 32 is formed from two end units 60 interconnected by two upper cross-beams 23 and one lower cross-beam 22. The end units 60 are themselves each formed from two upright legs 20 spaced apart by an upper cross-beam 23 and a lower cross-beam 22. Damper mounts 29 are fixed proximal the corners of the rectangular area 40 defined within the frame 32, and individual of the damper mounts 29 are affixed to both an upper cross-beam 23 connecting an end unit 60 and said end unit 60 so as to give additional rigidity to the frame 32.

While the embodiments of the invention have been described with reference to optical breadboards, those skilled in the art will realize that the terms optical breadboard and optical table top are not clearly technically distinct from each other, although the term optical table top is usually understood to mean a structure of 20 cm (8") or more in depth, whereas optical breadboards are typically thinner. For this reason, it will be understood that references to optical breadboard in this document shall be construed as including optical table top.

It is noted that the above-described embodiment does not have any diagonal strengthening elements, such as in the prior art. This follows from the benefit of the inherent structural rigidity of the proposed cross-beam structure, which means that diagonal strengthening elements are not needed. The frame is thus more elegant, and simpler and less costly to produce.

While in certain example embodiments of the invention described previously the positioning of damper mounts 29 has been described in relation to an upper support beam, it is to be understood that the upper support beam is an optional feature. Many possible arrangements for positioning damper mounts 29 are envisaged, including using a plurality of upper support beams and not using any upper support beams at all.

While in certain example embodiments of the invention described previously the frame anchor points 28 have been described in relation to mounting posts 42 incorporating spigots 44, many other types of mounting arrangement using frame anchor points 28, including those incorporating a screw-thread, are envisaged.

It will also be understood that the legs 20 need not be cylindrical, and that the cross-beams 22, 23 need not be rectangular in cross-section. For example, the cross-beams 22, 23 may be circular, octagonal or "D"-shaped in cross-section.

The optical breadboard dimensions can be varied as desired. Some typical lateral dimensions are 750×750 mm, 750×900 mm, 750×1200 mm, 900×900 mm and 900×1200 mm.

It will be appreciated that although particular embodiments of the invention have been described, many modifications/additions and/or substitutions may be made within the spirit and scope of the present invention.

What is claimed is:

1. An optical workstation comprising an optical breadboard supported by a frame, the frame comprising a plurality of upstanding legs interconnected by laterally extending cross-beams, the cross-beams laterally enclosing a space into which the optical breadboard is received.

2. The optical workstation of claim 1, wherein the frame is at least partially aluminum.

3. The optical workstation of claim 2, wherein the legs are aluminum.

4. The optical workstation of claim 2, wherein the cross-beams are aluminum.

5. The optical workstation of claim 1, wherein at least one of the cross-beams comprises a line or array of regularly spaced anchor points for mounting components.

6. The optical workstation of claim 5, wherein the anchor points comprise spigot holes.

7. The optical workstation of claim 5, wherein the anchor points comprise threaded holes.

8. The optical workstation of claim 1, wherein the optical breadboard is mounted to the frame by damping units.

9. The optical workstation of claim 1, wherein the frame comprises first and second end units, and laterally extending cross-beams interconnecting the first and second end units, the first and second end units each comprising two legs and laterally extending upper and lower cross-beams.

\* \* \* \* \*